United States Patent [19]

Hong et al.

[11] Patent Number: 5,695,530
[45] Date of Patent: Dec. 9, 1997

[54] METHOD FOR MAKING HIGH CHARGING EFFICIENCY AND FAST OXYGEN RECOMBINATION RECHARGEABLE HYDRIDE BATTERIES

[76] Inventors: Kuochih Hong, 1790 Rollingwoods, Troy, Mich. 48098; Kuoshiu Hong, 10 F, No. 8, Li-Nung Street Sec 1, Taipei; Huiyim Hong, 4F, No. 9, 32 Nung, Alley 189 Cheng-Tai Raod, Sec. 1, Wu-Ku Hsiang, Taipei, both of Taiwan

[21] Appl. No.: 661,078

[22] Filed: Jun. 10, 1996

Related U.S. Application Data

[63] Continuation-in-part of Ser. No. 212,354, Mar. 14, 1994, Pat. No. 5,541,017.

[51] Int. Cl.$^6$ .................................................. H01M 4/38
[52] U.S. Cl. ............................ 29/623.1; 429/59; 429/101; 429/218; 420/595; 420/644
[58] Field of Search ................................ 429/59, 101, 218, 429/219, 223, 224, 233; 420/455, 900; 423/644, 595; 29/623.1, 623.5

[56] References Cited

U.S. PATENT DOCUMENTS

| | | |
|---|---|---|
| 3,660,082 | 5/1972 | Negishi et al. |
| 4,160,014 | 7/1979 | Gamo et al. |
| 4,195,989 | 4/1980 | Gamo et al. |
| 4,370,163 | 1/1983 | Muriwaki et al. |
| 4,431,561 | 2/1984 | Ovshinsky et al. |
| 4,440,736 | 4/1984 | Macland et al. |
| 4,551,400 | 11/1985 | Sapru et al. |
| 4,623,597 | 11/1986 | Sapru et al. |
| 4,716,088 | 12/1987 | Reichman et al. |
| 4,728,586 | 3/1988 | Venkatesan. |
| 4,837,119 | 6/1989 | Ikoma et al. |
| 4,849,205 | 7/1989 | Hong. |
| 4,915,898 | 4/1990 | Wolff et al. |
| 4,946,646 | 8/1990 | Gamo et al. |

(List continued on next page.)

Primary Examiner—M. Nuzzolillo

[57] ABSTRACT

The present invention discloses a method to make a high rate, fast oxygen recombination and long life rechargeable metal oxide-hydride batteries, and in particular, rechargeable nickel-hydride batteries. The battery, according to this invention, is composed of a high rate, fast oxygen recombination and long life hydrogen storage electrode as a negative electrode. The hydrogen storage material is prepared to have a thin oxide top surface layer and a metal-rich subsurface layer, especially a nickel-rich subsurface layer. In the microstructure, it is preferable that it consists of a nickel-rich composition in one type of the grains and/or in grain boundaries. The hydride electrode made has an electrochemical capacity from 1.15 to 2.40 AH/cc. Before or after cell assembly, sealing, and/or using, the hydrogen storage electrode is chemically or electrochemically precharged to a state having a half-cell open circuit potential of −0.790 to −0.905 V vs. Hg/HgO reference electrode, and to have an initial charging potential of −0.830 to −1.005 V vs. Hg/HgO reference electrode at a current density of 100 mA/g of active material. The hydrogen storage electrode is composed of at least a hydrogen storage material (alloy), and/or its hydride thereof. The hydrogen storage material consists of nickel and at least five other elements as modifiers; where the atomic mole percent of nickel in the material is greater than 18 at. % but less than 80 at. %, preferably greater than 30 at. % but less than 65 at. %. The modifiers include: (a) at least two hydride formers selected from the group of Ti, Zr, Hf, V, Nb, Ta, Y, Sc, Mg, Ca, Pd, and rare earth metals; (b) at least one de-stabilizing agent selected from the group of Cr, Mn, Fe, Co, Cu, Zn, Mo, Sn, C, B, Sb, Si, Bi Ge, Ga, N, O, and Sn; (c) at least one element selected from the group of corrosion resisting agents selected from the group consisting of Cr, Co, W, Mo, Nb, Hf, and Ta; and (d) at least one element selected from the groups of oxygen getters, catalysts, or the combinations. The oxygen getter is selected from the group consisting of alkali metals, Ca, Al, Sr, Ba, Zr, Hf, Ti, rare earth metals, P, and S. The catalyst is selected from the group consisting Cu, Mn, W, Mo, Pd, Co and O.

44 Claims, 1 Drawing Sheet

U.S. PATENT DOCUMENTS

| | | |
|---|---|---|
| 5,006,328 | 4/1991 | Hong . |
| 5,077,149 | 12/1991 | Ikoma et al. . |
| 5,096,667 | 3/1992 | Petcenko et al. . |
| 5,104,617 | 4/1992 | Fetcenko et al. . |
| 5,238,756 | 8/1993 | Fetchenko . |
| 5,242,656 | 9/1993 | Zhang et al. . |
| 5,277,999 | 1/1994 | Ovshinsky et al. . |
| 5,501,917 | 3/1996 | Hong .................................. 429/101 |
| 5,541,017 | 7/1996 | Hong et al. ............................. 429/59 |

METHOD FOR MAKING HIGH CHARGING EFFICIENCY AND FAST OXYGEN RECOMBINATION RECHARGEABLE HYDRIDE BATTERIES

CROSS-REFERENCE TO RELATED APPLICATIONS

This application is a continuation in part application of application Ser. No. 08/212,354 filed Mar. 14, 1994, which is now U.S. Pat. No. 5,541,017.

BACKGROUND OF THE INVENTION

1. Field of the Invention

This invention relates to rechargeable hydride batteries. More particularly, the invention discloses a method to make high efficiency, fast oxygen recombination and long life rechargeable batteries comprising of a metal oxide-hydride couple in which the negative electrode is made of an improved hydride/hydrogen storage electrode.

2. The Related Art

Hong in the early 1980s invented three groups of polycrystalline hydrogen storage electrode materials: Ti-V-Ni, Ti-Zr-V-Ni and Ti-Cr-V-Ni, which are described in U.S. Pat. No. 4,551,400. These materials are the foundation of $AB_2$-type hydrogen storage electrode alloys. These alloys have high capacity, but short cycle life, high self-discharge rate, and/or are very difficult to activate. U.S. Pat. No. 4,716,088 describes methods to activate these materials, including: (a) electrochemically charging and discharging; (b) precharging to a state equivalent to a potential of about −0.70V vs. Hg/HgO/OH− reference electrode when discharged at 5 to 25 mA/g of active material; and (c) contacting with alkaline material for a sufficient time at a sufficient temperature. However, these methods are not different from prior arts and are not very useful for an ordinary people in the art. Based on the above alloys, U.S. Pat. Nos. 4,728,586, 5,096,667, 5,104,617 and 5,238,756 disclose a Ti-Zr-V-Ni-Cr-based alloy for a hydride electrode. This kind of alloy is also a $AB_2$ type and still has some weaknesses. The alloys disclosed in these patents are very expensive and have a high corrosion rate in an alkaline medium. Also, these patents do not provide a method to make a workable high charging efficiency, fast oxygen recombination and long life rechargeable cell. Consequently, the cell made has a poor oxygen recombination rate and high internal pressure during overcharge, and the cycle life is short as shown in these patents.

Apart from the $AB_2$-type alloy, Hong in U.S. Pat. Nos. 4,849,205 and 5,006,328, and Gamo et. at. in U.S. Pat. No. 4,946,646 disclose $AB_x$ type hydride storage electrode alloys. The $AB_x$ type alloy has better properties than the $AB_2$ type alloy. However, little or no information is given regarding how to fabricate a high charging efficiency, fast oxygen recombination, and long life rechargeable electrochemical cell using these alloys. More recently, Zhang et at. in U.S. Pat. No. 5,242,656 disclose a hydride battery using a $CaNi_5$-type alloy, $MmNi_{5-x-y-z-u}A_xB_yC_zD_u$, where Mm is mischmetal, A=Mn, Sn, or V; B=Cr, Co, Ti, Zr, or Si; C=Al, Mg, or Ca; D=Li, Na, or K; and 0<x<0.95, 0<y<1, 0<z<0.7, 0.1<u<0.9; or a ternary ally, $Ti_2Ni_{1-u}D_u$, where D=Li, Na, or K; and 0.04<u<0.9. However, the $CaNi_5$ structure and the use of a large amount of rare earth metals, limit the availability of the raw material source and alloy selection. Furthermore, similar to the prior arts, this patent does not provide a method to make a workable high charging efficiency, fast oxygen recombination and long life rechargeable cell.

To solve these problems, the present invention discloses a method to make a newly improved hydride battery using an improved hydrogen storage/hydride electrode.

SUMMARY OF THE INVENTION

The present invention discloses a method to make high charging efficiency, fast oxygen recombination, and long life rechargeable metal oxide-hydride batteries, and in particular, rechargeable sealed nickel-hydride batteries. The battery, according to this invention, is composed of a container, a high capacity positive electrode, a high capacity negative electrode, a separator positioned between the positive and negative electrodes, and an electrolyte in the container and in contact with the positive and negative electrodes and the separator. The negative electrode is a high charging efficiency, fast oxygen recombination, and long life hydrogen storage electrode.

The hydrogen storage electrode is composed of at least one hydrogen storage material and/or its hydride. According to this invention, a hydrogen storage alloy in a hydrogen storage electrode is prepared to have a very thin and loose oxide-rich top surface layer and a metal-rich subsurface layer. The oxide-rich top surface layer is less than 750 angstrom (A). Furthermore, the hydrogen storage material of this invention preferably consists of grain boundaries and/or at least one type of grains having metal-rich, especially nickel-rich, compositions. Therefore the electrode and battery made have a high charging efficiency and fast oxygen recombination rate. The hydrogen storage material may also contain one of other types of grains having compositions rich in hydride formers (i.e. hydride former-rich composition). In a nickel-rich composition, the amount of nickel is greater than any one of the other elements in the composition, preferably greater than 40 at. %. In the hydride former-rich composition, at least one hydride former has a greater amount of atomic mole percent (at. %) than that of nickel.

The hydrogen storage material of this invention consists of nickel and at least five other different elements as modifiers; where the atomic mole percent of nickel in the material is 18–80 at. %, preferably 30–65 at. %, further preferably 35–65 at. %. The modifiers include: (a) two or more hydride formers, preferably at least three hydride formers, selected from the group of Ti, Zr, Hf, V, Nb, Ta, Y, Sc, and Mg; (b) at least one destabilizing hydride element selected from the group of Cr, Mn, Fe, Co, Cu, Zn, Mo, Sn, C, B, Sb, Si, Bi, Ge, Ga, N, O, and Sn; (c) at least one corrosion resistant element selected from the group consisting of Cr, Co, W, Mo, Nb, Hf, and Ta; and (d) at least one element selected from the group of oxygen getters or catalysts. The oxygen getter is selected from the group consisting of alkali metals, Ca, Al, Sr, Ba, Zr, Hf, Ti, rare earth metals, P, and S. The catalyst is selected from the group consisting of Cu, Mn, W, Mo, Pd, Ag, Co and O. The atomic mole percent of nickel in the alloy is preferably greater than any of the other elements in the composition. The amount of the hydride former group is 25–68 at. %, preferably 38–58 at. % and if present, Zr is preferably less than 30 at. %. The amount of the destabilizing element group is less than 18 at. %, preferably less than 12 at. %, and if present, Fe is preferably less than 2 at. %. The amount of the corrosion resistant element group excluding Nb is less than 15 at. %, preferably less than 8.0 at. %. The amount of the oxygen getter group excluding Zr and Ti is less than 12 at. %, preferably less than 8.0 at. %. The amount of the catalyst group is less than 15 at. %, preferably less than 8.0 at. %. The amount of dual function elements: Nb, Zr and Ti, is limited by the amount of the hydride former group, and if present, Mo is less than 8.0 at. %, oxygen is 0–2.0 at. %, preferably 0–0.20 at. %.

Specifically, the hydrogen storage alloy, preferably consisting of at least six elements, has a composition represented by:

$$A_a B_b Ni_c D_y M_x R_z$$

where Ni is the element nickel and other components, A, B, D, M and R are defined by: A consists of Ti plus at least one element selected from the group consisting of Zr, Hf, Nb, and Mg,; B is at least one element selected from the group consisting of Al, V, Mn, Nb, Si, Pd and Ag; D is at least one element selected from the group consisting of Cr, Mn, Fe, Co, Cu, Zn, Nb, Mo, W and Sn; R is at least one element selected from the group consisting of C, B, Ca, Sb, Bi, Sc, Y, Hf, Ta, N, O, Ge, Ga and Mm, where Mm is a mischmetal which is a mixture of rare earth metals; M is at least one element selected from the group consisting of Li, Na, K, Rb, Cs, P and S; where a, b, c, x, y and z are defined by: $0.10 \leq a \leq 0.85$, $0 < b \leq 0.28$, $0.18 \leq c \leq 0.80$, $0 \leq y \leq 0.30$, $0 \leq x \leq 0.30$, $0 \leq z \leq 0.30$, $a+b+c+y+x+z=1.00$; and if present, Mm is 0–15 at. %, O is 0–5.0 at. %, Mn is 0–25 at. %, Mo is 0–8 at. %; preferably, Mm is 0–8.0 at. %, O is 0–2.0 at. %, Mu is 0–18 at. %; preferably, $0.40 \leq a \leq 0.65$, $0.02 \leq b \leq 0.28$, $0.25 \leq c \leq 0.65$, $0 < y \leq 0.15$, $0 \leq x \leq 0.15$, $0 \leq z \leq 0.15$; also preferably, $0.35 \leq c \leq 0.65$ and if present, Zr is preferably less than 30 at. %, Fe is preferably less than 2.0 at. % and/or $0.07 \leq y+z \leq 0.15$.

Alternatively, the negative electrode is composed of a hydrogen storage alloy, preferably consisting of at least six elements, having a composition represented by:

$A_a B_b Ni_c D_y Q_p M_x R_z$ and its hydride thereof;

where Ni is nickel and other components, A, B, D, Q, M and R are defined by: A consists of Ti plus at least one element selected from the group consisting of Zr, Hf, Nb, and Mg; B is at least one element selected from V, Mn, and Cr; D is Al and/or Si; Q is at least one element selected from the group consisting of Fe, Co, Cu, Zn, Nb, Mo, W, Pd, Ag, and Sn; M is at least one dement selected from the group consisting of Li, Na, K, Rb, Cs, P and S; R is at least one element selected from the group consisting of C, B, Ca, Sb, Bi, Sc, Y, Hf, Nb, Ta, N, O, Ge, Ga and Mm, where Mm is the mischmetal; and the atomic mole ratios: a, b, c, y, p, x and z are defined by: $0.10 \leq a \leq 0.85$, $0 < b \leq 0.38$, $0.18 \leq c \leq 0.80$, $0 \leq y \leq 0.15$, $0 \leq p \leq 0.30$, $0 \leq x \leq 0.30$, $0 \leq z \leq 0.30$, and $a+b+c+x+y+z+p=1.00$; and if present, Mm is 0–15.0 at. %, O is 0–2.0 at. %, Mn is 0–25 at. %, Fe is less than 2.0 at. %, Mo is 0–8 at. %; preferably Mn is 0–18.0 at. %, Mm is 0–8.0 at. %, and Al is 0–8.0 at. %; also preferably $0.40 \leq a \leq 0.65$, $0 < b \leq 0.28$, $0.30 \leq c \leq 0.55$, $0 \leq y \leq 0.15$, $0 \leq p \leq 0.08$, $0 \leq x \leq 0.15$, $0 \leq z \leq 0.08$; and further preferably, Zr is less than 30 at. % and/or $0.07 \leq p+z$.

Alternatively further, the hydrogen storage electrode is composed of a hydrogen storage alloy, preferably consisting of at least six elements, selected from the groups having compositions represented by:

$Ti_a Zr_b Ni_c Mn_d D_e Q_p R_z M_x$ and its hydride thereof;
$Ti_a Zr_b Ni_c Mn_d D_e Cr_p M_x R_z$ and its hydride;
$Ti_a Zr_b Ni_c Mn_d V_e Mo_p M_x R_z$ and its hydride thereof;
$Ti_a Zr_b Ni_c Mn_d Nb_e Cr_p M_x R_z$ and its hydride thereof;
$Ti_a Hf_b Ni_c Mn_d V_e Mo_p M_x R_z$ and its hydride thereof;
$Ti_a Zr_b Ni_c Mn_d V_e Cr_p M_x R_z$ and its hydride thereof;

where D is V and/or Nb; Q is at least one element selected from the group consisting of Cr and Mo; M is at least one element selected from the group consisting of Hf, C, B, Zn, Sn, Sb, Nb, Bi, Sc, Y, Ta, N, O, Ge, Ca, Li, Na, K, Rb, Cs, P and S; R is at least one element selected from the group consisting of Al, Mg, Ca, Si, Cr, Co, Fe, Cu, W, Mo, Pd, Ag, and Mm, where Mm is mischmetal; and where the atomic mole ratios: a, b, c, p, x, y and z are defined by: $0.01 \leq a \leq 0.65$, $0 < b \leq 0.45$, $0.18 \leq c \leq 0.80$, $0 \leq d \leq 0.22$, $0 \leq e \leq 0.38$, $0 \leq p \leq 0.30$, $0 \leq x \leq 0.15$, $0 \leq z \leq 0.15$, and $a+b+c+d+e+p+x+z=1.00$; and, if present, preferably Mm is 0–15.0 at. %, Fe is 0–2.0 at. %, Mo is 0–8 at. %, and O is 0–2.0 at. %; preferably Mm is 0–8.0 at. %, $0.03 \leq a \leq 0.45$, $0 < b \leq 0.40$, $0.30 \leq c \leq 0.65$, $0 \leq d \leq 0.18$, $0 \leq e \leq 0.32$, $0 \leq p \leq 0.15$, $0 \leq x \leq 0.15$, and $0 \leq z \leq 0.15$; another preferably, $0.02 \leq a \leq 0.40$, $0 < b \leq 0.30$, $0.30 \leq c \leq 0.55$, $0 \leq d \leq 0.18$, $0 \leq e \leq 0.10$, $0 \leq p \leq 0.08$, $0 \leq x \leq 0.08$, $0 \leq z \leq 0.10$; also preferably $0 < b < 0.30$.

The positive electrode is composed of a metal oxide, preferably nickel oxide. The separator is composed of a body selected from polyamide (nylon), polypropylene, and polysulfone. The electrolyte is composed of an alkaline solution. The container is made of either metal or plastic material.

In making a cell, the hydrogen storage electrode of this invention, before or after cell assembly and/or sealing, is precharged to a state having a half-cell open circuit potential of −0.790 to −0.905V, preferably −0.820 to −0.885V vs. Hg/HgO reference electrode, and has an initial charging potential of −0.830 to −1.005V, preferably −0.840 to −0.945 V vs. Hg/HgO reference electrode at a current density of 100 mA/g of active material in an alkaline aqueous solution.

It is the major object of the present invention to provide a method to make a high charging efficiency, fast oxygen recombination, and long life rechargeable nickel-hydride cell, especially a sealed type, using the aforementioned method, wherein as a consequence, the battery so made has a high rate capability, long cycle life, and low internal pressure in a sealed cell during overcharge.

The advantages, features and other objects of the present invention will become clear from the following detailed description.

DETAILED DESCRIPTION OF THE INVENTION

Figure 1:
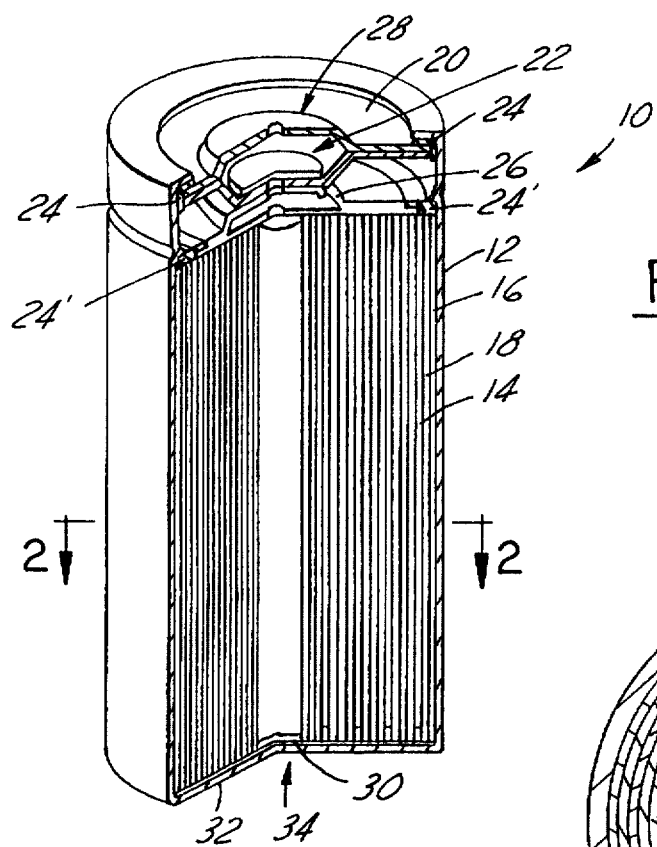
FIG. 1 is a partly sectional perspective view of a battery according to the present invention.

The present invention discloses a method to make an improved rechargeable metal oxide-hydride battery, and in particular, an improved high capacity nickel-hydride battery.

In a nickel-hydride battery, the electrochemical reactions are as follows:

At the positive electrode (Nickel electrode):

$$Ni(OH)_2 + OH^- \underset{discharge}{\overset{charge}{\rightleftarrows}} NiOOH + H_2O + e^- \quad (1)$$

At the negative electrode (hydride electrode):

$$M + H_2O + e^- \underset{discharge}{\overset{charge}{\rightleftarrows}} MH + OH^- \quad (2)$$

where M and MH are a multicomponent hydrogen storage alloy and its hydride, respectively. It is a common knowledge that the hydride generally is nonstoichiometric and should be expressed as $MH_x$.

During overcharge, water electrolysis will occur. Thus, oxygen will be generated at the positive electrode and hydrogen gas will be generated at the negative electrode. In a sealed cell, if the charging efficiency is bad, and the oxygen gas does not recombine with hydrogen or the recombination rate in the hydrogen storage electrode is poor, the internal pressure will increase and gases vent out through the safety valve. Therefore, the electrolyte will then be lost and cell life is consequently shortened. On the other hand, if a hydrogen storage electrode has a high charging efficiency and fast oxygen recombination rate, a sealed hydride cell made will have a low internal pressure and consequently a long life.

A high charging efficiency, fast oxygen recombination, and long life hydride battery, according to this invention, is composed of a container, a positive electrode, a negative electrode, a separator positioned between the positive and negative electrodes, and electrolyte in the container and in contact with the positive and negative electrodes and the separator. The negative electrode is a high charging efficiency, fast oxygen recombination, and long life hydrogen storage electrode.

The hydrogen storage electrode is composed of at least one hydrogen storage material and/or its hydride. According to this invention, a hydrogen storage alloy in a hydrogen storage electrode is prepared to have surfaces with a loose and thin oxide-rich layer and a metal-rich subsurface layer. Furthermore, the hydrogen storage material of this invention preferably has metal-rich, especially nickel-rich, compositions in grain boundaries and/or at least one type of grains. The hydrogen storage material may also contains one or two more types of grains having compositions rich in hydride formers (or a hydride former-rich composition). In a nickel-rich composition, the amount of nickel is greater than any other element in the composition, preferably greater than 40 at. %. In a hydride former-rich composition, at least one hydride former has a greater amount of atomic mole percent (at. %) than that of nickel.

In this invention, the hydrogen storage material which is not a $AB_5$ type alloy consists of nickel and at least five other different elements as modifiers; where the amount of nickel in the material is 18–80 at. %, preferably 30–65 at. %. The modifiers include: (a) at least two hydride formers selected from the group consisting of Ti, Zr, Hf, V, Nb, Ta, Y, Sc, and Mg; (b) at least one destabilizing hydride element selected from the group consisting of Al, Cr, Mn, Fe, Co, Cu, Zn, Mo, Sn, C, B, Sb, Si, Bi, Ge, Ca, N, and Sn; (c) at least one corrosion resistant element selected from the group consisting of Cr, Co, W, Mo, Nb, Hf, and Ta; and (d) at least one element selected from the group of oxygen getters or catalysts. The oxygen getter is selected from the group consisting of alkali metals, Ca, Al, Sr, Ba, Zr, Hf, Ti, rare earth metals, P, and S. The catalyst is selected from the group consisting of Cu, Mn, W, Mo, Pd, Ag, Co and O. The atomic mole percent of nickel in the alloy preferably is greater than any one of the other elements in the composition. The amount of the hydride former group is 25–68 at. %, preferably 38–58 at. % and if present, Zr is preferably less than 30 at. %. The amount of the destabilizing hydride element group is less than 18 at. %, preferably less than 12 at. %, and if present Fe is preferably less than 2.0 at. %. The amount of the corrosion resistant element group excluding Nb is less than 15 at. %, preferably less than 8.0 at. %. The amount of the oxygen getter group excluding Zr and Ti is less than 12 at. %, preferably less than 8.0 at. %. The amount of dual function elements: Nb, Zr and Ti is limited by the amount of the hydride former group. The amount of the catalyst group is less than 15 at. %, preferably less than 8.0 at. %; and if present, the amount of oxygen is 0–2.0 at. %, preferably 0–0.20 at. %, Mo is 0–8 at. %.

There are several factors to be considered regarding the selection of elements for inclusion in the hydrogen storage alloys of this invention. Hong in U.S. Pat. No. 5,006,328 teaches the use of heats of hydride formation and the amount of nickel to make a useful alloy, so that one can control the hydrogen equilibrium pressure, capacity and the electro-chemical catalytic property of a hydrogen storage/hydride electrode. Nickel is a very good electrochemical catalyst both for hydrogen evolution and hydrogen oxidation, and is excellent for oxygen recombination in a sealed cell. It also has a very good resistance in an alkaline medium. Therefore, a hydrogen storage alloy having a suitable amount of nickel as a matrix will have a good charging efficiency, excellent rate capability and long cycle life. According to the present invention, a hydrogen storage electrode material requires nickel 18–80 at. %, preferably 30–65 at. %, and a suitable amount of modifiers in the composition in order to have a good charging efficiency, fast oxygen recombination rate, high rate capability, long life and good capacity. A hydrogen storage electrode material having nickel less than 18 at. % would not have enough nickel in the surface and/or subsurface layers to provide a high rate charging and discharging, and a fast oxygen recombination. On the other hand, a hydrogen storage electrode material having nickel higher than 80 at. % would not have enough hydrogen storage capacity since nickel itself is not a hydride former. In this invention, good hydride formers such as Ti and Zr must be included as modifiers in an alloy composition to provide the alloy with a good hydrogen storage capacity and a desirable low hydrogen equilibrium pressure. The destabilizing hydride elements are weak hydride or non-hydride formers and can decrease the bonding between hydrogen and strong hydride formers. Suitable amount of destabilizing hydride elements in the alloy can provide fine tuning in the stability and the hydrogen equilibrium pressure, and therefore can improve the usable quantity of hydrogen stored in the alloy. A small amount (0.001 to 0.005 at. %) of oxygen or nitrogen in the alloy in many cases results in surface segregation and a metal-rich subsurface layer, and therefore enhances the catalytic effect. The oxygen getter during melting process will suck the oxygen present in raw element components, crucible, and melting chamber to form stable oxides localizing the oxygen in a small region of the alloy grains. Therefore, the spreading of oxygen into the interstitial positions in the grains and/or grain boundaries of the microstructure is prevented. Consequently, the alloy made will have a very thin oxide-rich top surface layer and a metal-rich subsurface layer as well as clean grains and clean grain boundaries to allow hydrogen to diffuse into and out of the electrode easily to increase charge and discharge efficiency. In addition, an oxygen getter such as Ti, Zr or a rare earth metal also serves as a good hydride former.

A good composition of a hydrogen storage alloy is an important factor for a high charging efficiency, fast oxygen recombination and long life hydride battery as mentioned above. On the other hand, a clean top surface and a metal-rich subsurface layers are another important factors to be considered. The subsurface layer is directly underneath the top surface layer, but above the region of the bulk composition. According to the present invention, the chemical compositions of top surface and subsurface layers of a hydrogen storage alloy are not the same as that in the bulk. The hydrogen storage alloy of this invention in the negative electrode consists of a loose and thin oxide-rich top surface layer and a metal-rich, especially a nickel-rich subsurface layer. Specifically, the thickness of the top surface oxide-rich layer is less than 750 Å, preferably less than 350 Å, further preferably less than 100–150 Å. The thickness of the metal-rich subsurface layer is at least about 100–2000 Å depending on the cleanness and the size of alloy particles. In an oxide-rich top layer, more than 50 at. % of metal is in the oxide form. In a metal-rich subsurface layer, the amount of metals in the metallic state is greater than that in the form of oxide. Specifically, the amount of metallic metals in metal-rich subsurface layer is higher than 50 at. %, especially the amount of nickel in the subsurface layer is at least 18–25 at. %, preferably at least 30 at. %, further preferably, the amount of nickel in subsurface layer is at least 40 at. %. The compositions of top surface and subsurface layers can be determined by Anger Electron Spectroscopy (AES). The states of metals also can be identified by electron spectroscopy for chemical analysis (ESCA) or x-ray photoelectron spectroscopy (XPS). The surface oxides also can be further detected by transmission electron microscopy (TEM). For a hydrogen storage electrode and the hydride battery made, a loose and thin oxide-rich top surface layer and a metal-rich, especially a nickel-rich, subsurface layer, are essential in order to have a good charging efficiency, a high rate performance, a fast oxygen recombination rate and a good resistance to the corrosion in the alkaline electrolyte solution. Therefore, the electrode and battery made will have an excellent charge efficiency, a high rate capability, a low internal pressure and a long life.

An exemplary hydrogen storage alloy of this invention, preferably consisting of at least six elements, is represented by a composition:

$Ti_aZr_bNi_cMn_dD_eCr_fM_x$ and its hydride;

where D is V and/or Nb; M is at lease one element selected from the group of Al, Fe, Co, Cu, Zn, Mo, Sn, C, B, Sb, Si, Bi, Ge, Ga, N, W, Ca, Sr, Ba, Hf, Pd, Ag, O, alkali metals, and Mm; where Mm is mixture of rare earth metals; and the atomic mole ratios a, b, c, d, e, f, and x are defined by: $0.01 \leq a \leq 0.65$, $0.01 \leq b \leq 0.45$, $0.18 \leq c \leq 0.80$, $0 \leq d \leq 0.25$, $0 \leq e \leq 0.30$, $0 \leq p \leq 0.30$, $0 \leq x \leq 0.15$, and $a+b+c+d+e+p+x=1.00$; if present, preferably Mm is 0–12.0 at. %, Fe is less than 2.0 at. %, Mo is 0–8 at. %, and O is 0–2.0 at. %; preferably $0.03 \leq a \leq 0.45$, $0.05 \leq b \leq 0.40$, $0.30 \leq c \leq 0.65$, $0 \leq d \leq 0.18$, $0 \leq e \leq 0.28$ $0 \leq p \leq 0.15$, and $0 \leq x \leq 0.15$; another preferably, $0.05 \leq a \leq 0.40$, $0.05 \leq b \leq 0.40$, $0.30 \leq c \leq 0.58$, $0 \leq d \leq 0.18$, $0 \leq e \leq 0.28$, $0 \leq x \leq 0.10$, $0 \leq p \leq 0.10$; also preferably $0.05 \leq a \leq 0.25$, $0.10 \leq b \leq 0.30$, $0.36 \leq c \leq 0.52$, $0.03 \leq d \leq 0.15$, $0 \leq e \leq 0.10$, $0 \leq x \leq 0.10$, and if present, Zr is preferably less than 30 at. % and $0 \leq p \leq 0.05$.

Alternatively, a hydrogen storage electrode of a high charging efficiency, fast oxygen recombination, and long life hydride battery is composed of a hydrogen storage alloy, preferably consisting of at least six elements, having a composition represented by:

$A_aB_bNi_cD_yM_xR_z$ and its hydride thereof;

where Ni is the element nickel and other components A, B, D, M and R are defined by: A consists of Ti plus at least one element selected from the group consisting of: Zr, Hf, Nb, and Mg; B is at least one element selected from the group consisting of Al, V, Mn, Nb, Si, Pd and Ag; D is at least one element selected from the group consisting of: Cr, Mn, Fe, Co, Cu, Zn, Mo, W and Sn; R is at least one element selected from the group consisting of: C, B, Ca, Bi, Sb, Y, Sc, Hf, Ta, N, O, Ge, Ga and Mm, where Mm is mischmetal; M is at least one element selected from the group consisting of Li, Na, K, Rb, Cs, P and S; and where the atomic mole ratios: a, b, c, x, y and z are defined by: $0.10 \leq a \leq 0.85$, $0 < b \leq 0.28$, $0.18 \leq c \leq 0.8$, $0 \leq y \leq 0.30$, $0 \leq x \leq 0.30$, $0 \leq z \leq 0.30$, $a+b+c+y+x+z=1.00$; and if present, preferably Mm is 0–12.0 at. %, O is 0–5.0 at. %, Mn is 0–25 at. %, Fe is less than 2.0 at. %, Mo is 0–8 at. %; preferably, Mm is 0–8.0 at. %, O is 0–2.0 at. %, Mn is 0–18 at. %; preferably, $0.40 \leq a \leq 0.65$, $0.02 \leq b \leq 0.28$, $0.25 \leq c \leq 0.65$, $0 \leq y \leq 0.15$, $0 \leq x \leq 0.15$, $0 \leq z \leq 0.15$; also preferably, $0.30 \leq c \leq 0.65$ and if present, Zr is less than 30 at. % and/or $0.07 \leq y+z \leq 0.15$.

Another alternatively, the hydrogen storage electrode is composed of at least one hydrogen storage alloy, preferably consisting of at least six elements, having a composition represented by:

$A_aB_bNi_cD_yQ_pM_xR_z$ and its hydride thereof;

where A consists of Ti plus at least one element selected from the group consisting of Zr, Hf, Nb, and Mg; B is at least one dement selected from the group consisting of V, Mn, and Cr; D is Al and/or Si; Q is at least one element selected from the group consisting of: Fe, Co, Cu, Zn, Nb, Mo, W, Pd, Ag and Sn; Ga and Mm, where Mm is the mischmetal; M is at least one element selected from the group consisting of Li, Na, K, Rb, Cs, P and S; where the atomic mole ratio, a, b, c, p, x, y and z are defined by: $0.10 \leq a \leq 0.85$, $0 < b \leq 0.38$, $0.18 \leq c \leq 0.80$, $0 \leq y \leq 0.15$, $0 \leq p \leq 0.30$, $0 \leq x \leq 0.30$, $0 \leq z \leq 0.30$, and $a+b+c+x+y+z+p=1.00$; and if present, preferably Mm is 0–12.0 at. %, O is 0–2.0 at. %, Mn is 0–25 at. %, Fe is 0–2.0 at. %, Mo is 0–8 at. %; or preferably Mn is 0–18.0 at. %, Mm is 0–8 at. %, and Al is 0–8.0 at. %; also preferably $0.40 \leq a \leq 0.65$, $0 < b \leq 0.28$, $0.30 \leq c \leq 0.55$, $0 \leq y \leq 0.15$, $0 \leq p \leq 0.08$, $0 \leq x \leq 0.15$, $0 \leq z \leq 0.08$; further preferably, Zr is less than 30 at. % and/or $0.07 \leq p+z$.

Alternatively further, the hydrogen storage electrode is composed of at least one hydrogen storage alloy, preferably consisting of six or more elements, selected from the groups having compositions represented by:

$Ti_aZr_bNi_cMn_dD_eQ_pR_zM_x$, and its hydride thereof;

$Ti_aZr_bNi_cMn_dD_eCr_pM_xR_z$ and its hydride;

$Ti_aZr_bNi_cMn_dV_eMo_pM_xR_z$ and its hydride thereof;

$Ti_aZr_bNi_cMn_dNb_eCr_pM_xR_z$ and its hydride thereof;

$Ti_aHf_bNi_cMn_dV_eMo_pM_xR_z$ and its hydride thereof;

$Ti_aZr_bNi_cMn_dV_eCr_pM_xR_z$ and its hydride thereof;

where D is V and/or Nb; Q is at least one element selected from the group consisting of Cr and Mo; M is at least one element selected from the group consisting of Hf, C, B, Zn, Sn, Sb, Nb, Bi, Sc, Y, Ta, N, O, Ge, Ga, Li, Na, K, Rb, Cs, P and S; R is at least one element selected from the group consisting of Al, Mg, Ca, Si, Cr, Co, Fe, Cu, W, Mo, Pd, Ag, and Mm; and where the atomic mole ratios: a, b, c, p, x, y and z are defined by: $0.01 \leq a \leq 0.65$, $0 < b \leq 0.45$, $0.18 \leq c \leq 0.80$, $0 \leq d \leq 0.22$, $0 \leq e \leq 0.38$, $0 \leq p \leq 0.30$, $0 \leq x \leq 0.15$, $0 \leq z \leq 0.15$, and $a+b+c+d+e+p+x+z=1.00$; if present, preferably Mm is 0–12.0 at. %, Fe is 0–2.0 at. %, Mo is 0–8 at. %, and O is 0–2.0 at. %; preferably Mm is less than 8.0 at. %, $0.03 \leq a \leq 0.45$, $0 \leq b \leq 0.40$, $0.30 \leq c \leq 0.65$, $0 \leq d \leq 0.18$, $0 \leq e \leq 0.32$, $0 \leq p \leq 0.15$, $0 \leq x \leq 0.15$, and $0 \leq z \leq 0.15$; another preferably, $0.02 \leq a \leq 0.40$, $0 < b \leq 0.30$, $0.30 \leq c \leq 0.55$, $0 \leq d \leq 0.18$, $0 \leq e \leq 0.10$, $0 \leq p \leq 0.08$, $0 \leq x \leq 0.08$, $0 \leq z \leq 0.10$; also preferably $0 < b \leq 0.30$.

Several simple exemplary alloys of the present invention are:

$Ti_{0.120}Zr_{0.264}Ni_{0.470}Mn_{0.080}V_{0.040}Cr_{0.020}Hf_{0.096}$
$Ti_{0.120}Zr_{0.260}Ni_{0.484}Mn_{0.070}V_{0.030}Cr_{0.014}Mm_{0.020}$
$Ti_{0.130}Zr_{0.250}Ni_{0.490}Mn_{0.020}Nb_{0.050}Cr_{0.020}Mm_{0.020}$
$Ti_{0.090}Zr_{0.290}Ni_{0.460}Mn_{0.100}Nb_{0.020}Cr_{0.020}Mm_{0.020}$
$Ti_{0.090}Zr_{0.270}Ni_{0.379}Mn_{0.162}V_{0.046}Cr_{0.045}Hf_{0.008}$
$Ti_{0.098}Zr_{0.203}Ni_{0.346}Mn_{0.020}V_{0.277}Cr_{0.048}Al_{0.006}Si_{0.002}$

-continued $Ti_{0.092}Zr_{0.273}Ni_{0.384}Mn_{0.132}V_{0.067}Cr_{0.046}Al_{0.005}Si_{0.001}$
$Ti_{0.110}Zr_{0.230}Ni_{0.484}Mn_{0.080}Nb_{0.030}Cr_{0.014}Mm_{0.020}Li_{0.012}$
$Ti_{0.172}Zr_{0.160}Ni_{0.382}Mn_{0.020}V_{0.230}Cr_{0.028}Al_{0.006}Si_{0.002}$
$Ti_{0.099}Zr_{0.203}Ni_{0.346}Mn_{0.020}V_{0.277}Cr_{0.049}Al_{0.005}Si_{0.001}$
$Ti_{0.370}Zr_{0.064}Ni_{0.432}Mn_{0.040}V_{0.060}Cr_{0.014}Mm_{0.020}$
$Ti_{0.092}Zr_{0.273}Ni_{0.384}Mn_{0.133}V_{0.067}Cr_{0.046}Al_{0.005}$
$Ti_{0.218}Zr_{0.180}Ni_{0.400}Mn_{0.080}V_{0.080}Cr_{0.040}Al_{0.002}$
$Ti_{0.120}Zr_{0.270}Ni_{0.460}Mn_{0.080}Nb_{0.040}Cr_{0.030}$
$Ti_{0.220}Zr_{0.176}Ni_{0.400}Mn_{0.080}V_{0.080}Cr_{0.040}Hf_{0.004}$
$Ti_{0.254}Zr_{0.194}Ni_{0.444}Mn_{0.030}V_{0.058}Mo_{0.020}$ and the hydrides thereof.

Other exemplary alloys of the present invention are:

$Ti_{1-aa}Zr_{aa}V_bNi_cQ_pM_x$;
$Ti_{1-aa}Zr_{aa}Cr_bNi_cQ_pM_x$;
$Ti_{1-aa}Zr_{aa}Cr_{bb}Mn_{b-bb}Ni_cQ_pM_x$;
$Ti_aV_{b-bb}Mn_{bb}Ni_cQ_pM_x$;
$Ti_{1-aa}Zr_{aa}V_{b-bb}Mn_{bb}Ni_cQ_pM_x$;
$Ti_{1-aa}Zr_{aa}V_bCr_yNi_cQ_pM_x$;
$Ti_{1-aa}Zr_{aa}V_bMo_yNi_cQ_pM_x$;
$Ti_{1-aa}Zr_{aa}Nb_bMo_yNi_cQ_pM_x$;
$Ti_{1-aa}Zr_{aa}Nb_bCr_yNi_cQ_pM_x$;
$Ti_{1-aa}Zr_{aa}Ta_bCr_yNi_cQ_pM_x$;
$Ti_{1-aa}Zr_{aa}Ta_bMo_yNi_cQ_pM_x$;
$Ti_{1-aa}Zr_{aa}V_bW_yNi_cQ_pM_x$;
$Ti_{1-aa}Zr_{aa}V_{bb}Nb_{b-bb}Cr_yNi_cQ_pM_x$;
$Ti_{1-aa}Zr_{aa}Nb_{b-bb}Ta_{bb}Cr_yNi_cQ_pM_x$;
$Ti_{1-aa}Zr_{aa}V_{bb}Ta_{b-bb}Cr_yNi_cQ_pM_x$;
$Ti_aNb_bCr_{y-yb}Mo_{yb}Ni_cQ_pM_x$;
$Ti_aTa_{b-bb}Nb_{bb}Cr_yNi_cQ_pM_x$;
$Ti_aTa_bCr_{y-yb}Mo_{yb}Ni_cQ_pM_x$;

and the hydrides thereof;

where Q is at least one element selected from the group consisting of C, B, Al, Ca, Mg, Si, Nb, Mn, Fe, Co, Cu, Zn, Hf, Mo, W, Pd, Ag, Sb, Bi, Y, Sc, Ta, O, N, Sn and Mm, where Mm is mischmetal, provided that Q does not include elements already given in the given formula; M is at least one element selected from the group consisting of Li, Na, K, Rb, Cs, S and P; and the atomic mole ratios: a, a', b, b', c, p, y, and x are defined by: $0.10 \leq a \leq 0.85$, $0 \leq a' \leq 1$, $0 < b \leq 0.45$, $0 \leq b' \leq 1$, $0.18 \leq c \leq 0.80$, $0 < y < 0.30$, $0 \leq p \leq 0.30$, $0 \leq x \leq 0.30$, $a+b+y+c+p+x=1.00$, or $a+b+c+p+x=1.00$, and if present, preferably Mn is 0–18 at. %; Mm is 0–8.0 at. %, Fe is less than 2.0 at. %, and O is 0–2.0 at. %; wherein preferably $0.40 \leq a \leq 0.65$, $0 < b \leq 0.40$, $0.30 \leq c \leq 0.65$, $0 \leq p \leq 0.15$, $0 \leq y \leq 0.15$, $0 \leq x \leq 0.15$; and also preferably Mn is 0–15 at. %, and Al is between 0–8.0 at. %; further preferably, Zr is less than 30 at. % and/or $0.07 \leq p$.

Alloys of this invention were made and used to make rechargeable hydrogen storage electrodes and hydride cells in accordance with the method described in the present invention. The hydrogen storage electrodes have an excellent charge efficiency, and a fast oxygen recombination rate. Therefore the sealed cells made have a high rate capability, a low internal pressure and a long life.

An alloy having a composition according to the present invention can be prepared first by mixing proper amounts of the elements or mixing elements with other commercially available master alloys such as nickel-zirconium, nickel-vanadium, ferrotitanium, aluminum-vanadium, nickel-niobium, ferrovanadium, etc., and then melting them in a crucible selected from graphite, alumina, zirconia or water-cooled copper, in an induction or arc furnace under high vacuum or a protective atmosphere selected from gases such as argon, hydrogen, nitrogen, hydrocarbon gas, or a mixture thereof. The homogeneous molten alloy is poured into a mold. The mold is made of a material similar to that of the crucible and is in a cooling system to cool the molten alloy quickly to obtain a homogeneous solid ingot. The alloy ingot made can be crushed first by conventional methods such as a press, then further pulverized to powder by hydriding/dehydriding cycles. According to this invention, as mentioned previously, oxygen getters form stable oxides localizing oxygen in a small region of the alloy grains. Therefore the ingot made have clean surfaces, grains and grain boundaries. The oxide-rich top surface layer is very thin and loose, and there is a clean metal-rich, especially nickel-rich subsurface layer. Consequently, the hydriding process is very easy and the activation is not necessary. A hydrogen pressure of about 3 atm. can readily charge the alloy. Furthermore, the desirable crystal structure of the alloy is polycrystalline having a single-phase or multiphase microstructures as indicated by x-my diffraction. As detected by SEM/EDX, the sizes, shapes, and compositions of the gains and grain boundaries in the microstructure generally vary. Dependent upon the overall composition of the hydrogen storage material, the microstructure consists of one, two or more major types of grains classified by the composition. It is preferred that the grain boundaries and/or at least one type of grain have compositions rich in nickel (i.e. nickel-rich composition). In addition, it is preferred that at least one of the other types of grain have compositions rich in hydride formers (i.e. hydride former-rich composition). In the nickel-rich composition, the amount of nickel is greater than any one of the other elements in the composition, preferably 40–65 at. %. The grains or grain boundaries having nickel-rich compositions are expected to have more electrochemical and catalytic functions, and the grains having a hydride former-rich composition are expected to store more hydrogen. The grain boundaries including microcracks are the major paths of hydrogen diffusing into and out of the grains. The hydrogen storage alloy of the present invention preferably consists of grain boundaries and/or at least one type of grains having nickel-rich compositions. Therefore a hydrogen storage electrode and a battery made are very easy to charge to allow hydrogen diffusing into or out of the electrode quickly to increase charge and discharge kinetics, efficiency, and to increase oxygen recombination rate during overcharge.

The powder prepared by the hydriding/dehydriding cycles generally has a size less than 100 mesh, preferably less than 325 mesh. A ball mill or any commercial pulverizer such as JET pulverizer can also be used to make powder. Before electrode making, the alloy powder may or may not be coated with a layer of metal selected from Ni, Cu, Al, Zn, and combination thereof. The hydrogen storage electrode containing an active material which is a hydrogen storage material, is then prepared by a pasting and/or sintering method with or without one or more powder binders selected from the group consisting of Ni, Cu, Al, Mg, Al-Mg alloy, Zn, Mn, C, CMC, PVA (polyvinyl alcohol), polyox, methylcellulose and hydroxylmethyl cellulose. The sizes of the powder binder are from 0.2 to 150 micrometers, preferably from 0.5 to 50 micrometers. The substrate current collector can be nickel or nickel-plated steel selected from the group of mesh, sponge, fiber, foam, perforated foil, and expanded foil. In the case of a sintering method, dried alloy powder having sizes from 100 to 400 mesh, with or without the powder binders aforementioned, is pressed with a pair of rollers onto the substrate to form the preliminary electrode which is then heated, under vacuum and/or a protective atmosphere selected from the group consisting of hydrogen mixing with argon, nitrogen, hydrocarbon, or the combination thereof, at temperatures from 450° to 1100° C. for 0.2 to 4 hours; preferably, from 600° to 950° C. for 0.3 to 2.5 hours under 0.1–0.9 atm. of hydrogen or hydrogen-argon atmosphere. In the case of a pasting method, the alloy powder having sizes less than 100 mesh is mixed with one or more of the aforementioned powder binders and pure water to make a paste or slurry. Then the paste or slurry is pressed onto the substrate current collector with a pasting, pressurizing or blade method. The resulting wet hydrogen storage hydride electrode is then dried at temperatures from 60° to 300° C. for 20–90 minutes under vacuum or a protective atmosphere selected from the group consisting of hydrogen mixing with argon, nitrogen, hydrocarbon, or the combination thereof, preferably, under 0.1–1.2 atm. of hydrogen or hydrogen-argon atmosphere. The hydrogen storage electrode of this invention thus made has an electrochemical capacity from 1.15 to 2.40 AH/cc and has a state of precharge having a half-cell open circuit potential of −0.790 to −0.905V vs. Hg/HgO reference electrode and it also has an initial charging potential of −0.830 to −1.005V vs. Hg/HgO reference electrode at a current density of 100 mA/g of active material in an alkaline aqueous solution at ambient temperature. The electrode thus is ready for use for cell assembly. However, if the environment during electrode making process or during the electrode storage is not well controlled, the electrode will have surface oxides or other impurities. So the half-cell open circuit potential and the initial charging potential of the electrode may not be in the range mentioned. The hydrogen storage electrode should be cleaned and precharged simultaneously before or after cell assembly, especially a sealed cell. The purpose of cleaning is to remove impurities, especially the thick surface oxide layer from the electrode surface. The purpose of precharging is to charge hydrogen into the electrode (1) to protect the newly clean surface from oxidation, (2) to generate microcracks to increase porosity and new fresh electrode surfaces, and (3) to protect the electrode from oxidation during overdischarge in a cell. The hydrogen storage electrode can be both cleaned and precharged electrochemically in an acidic or alkaline, or a salt solution at 45°–120° C. for 0.10 to 25 hours using nickel as an anode; preferably at 0.005–0.30 c-rate current in: (1) an acidic solution selected from: HF, $H_2SO_4$, $H_3PO_4$, $KHF_2$, sulfate (e.g. $NH_4HSO_4$), phosphate (e.g. $NaH_2PO_4$), and the combination thereof at 52°–100° C., or (2) an alkaline aqueous solution selected from: $N_{2H4}$, LiOH, NaOH, KOH, $NH_4OH$, sulfate, phosphate (e.g. $Na_2HPO_4$), and the combination thereof at 72°–100° C. for 0.15–20.0 hours. Alternatively, the electrode can be both cleaned and precharged chemically with: (1) an acidic solution, preferably a solution selected from the group of $H_2SO_4$, HF, $H_3PO_4$, $KHF_2$, sulfate (e.g. $NH_4HSO_4$), phosphate (e.g. $NaH_2PO_4$), and the combinations thereof, at 30°–120° C. for 0.10 to 25 hours, preferably 52° to 100° C. for 0.20 to 15.0 hours; or (2) an alkaline solution at 55° to 110° C. for 0.10 to 25 hours, preferably with a saturated or greater than 7.35M solution of $N_2H_4$, $NH_4OH$, LiOH, NaOH, KOH (>35 wt. %), $Na_2HPO_4$, and the combinations thereof at 72°–100° C. for 0.15 to 20.0 hours, either which followed by washing and drying. During cleaning and precharging, metal pieces such as Al, Zn, Raney nickel, Mg, Al-Mg alloy, and the combinations thereof can be added to the solution to provide a better result. Further alternatively, the electrode can be treated at 50°–300° C. under 1–5 atm. of $H_2$ for 0.1 to 2 hours. Thus the hydrogen storage electrode made has a thin and loose oxide-rich top surface layer, and a metal-rich, especially nickel-rich, subsurface layer. It has more porosity and more clean surfaces. The hydrogen storage electrode, before or after cell assembly and/or sealing, has a state of precharge corresponding to a half-cell open circuit potential of −0.790 to −0.905 V, preferably −0.820 to −0.885 V vs. Hg/HgO reference electrode, and it also has an initial (0–25 minutes) half-cell charging potential of −0.830 to −1.005 V (dropping from −1.150 to −1.300 V, before cleaning treatment), preferably −0.840 to −0.945 V vs. Hg/HgO reference electrode at a current density of 100 mA/g of active material, in an alkaline aqueous solution at ambient temperature. The precharged and cleaned electrode is ready for use as a negative electrode. Before use, the hydrogen storage electrode may be coated with a metal layer selected from the group of Ni, Al, Cu, Raney nickel, and the combination, by electrochemical or electrodeless plating, to enhance the performance.

A suitable size of the negative electrode is cut to combine with a matching size of the metal oxide positive electrode having an electrochemical capacity of from 0.45 to 0.75 AH/cc. The positive electrode active material at least comprises a metal oxide, preferably a nickel oxide plus 1–15 wt. % cobalt oxide. To ensure high efficiency, 0–15 wt. % of fine powder selected from the group consisting of Ni, Cu, Zn, C, Mg, Al, Mn, iodine, iodide (LiI, NaI, KI, etc.), hydride, and combinations thereof, is added during the preparation of a sintered or a pasted nickel positive electrode. The substrate current collector of the positive electrode is nickel or nickel-plated steel selected from the group of sponge, fiber, foam, perforated and expended foil. The positive electrode made thus is ready to use. In order to enhance the performance, the positive electrode may be coated with a thin layer of metal selected from nickel, aluminum, copper, zinc and combination thereof. The separator is cut of a similar size and is placed between the negative and positive electrodes to electrically separate then. The positive and negative electrodes with separator in between is placed in a container. The electrolyte is added. The separator is composed of a porous body of insulator film or thin sheet of organic or inorganic material selected from the group consisting of polyamide (such as nylon), polypropylene, polyethylene, polysulfone, PVC, and the combination thereof. The thickness of separator is from 0.1 mm to 2.00 mm, preferably from 0.20 mm to 0.50 mm. The electrolyte is composed of alkaline solution, preferably KOH solution with concentration from 20 to 40 wt. % plus 0 to 10 wt. % of LiOH. Suitable amounts (0–10 wt. %) of other chemicals such as an alkali iodide may be added to enhance the performance. The container is made of either a metal such as nickel-plated steel or plastic material such as PVC, polypropylene, polysulfone and polyamide.

There is another factor to make a better battery, especially a sealed battery. It is the N/P ratio, the electrochemical capacity ratio between the negative and positive electrodes. The battery, according to the present invention, has an N/P ratio of between 1.0 to 2.0, preferably 1.25 to 1.55. An N/P ratio of less than 1.0 will result in hydrogen evolution at the negative hydride electrode in early stages of charging without fully charging the positive electrode. Therefore, the cell will have a higher internal pressure and also a low working potential during discharging and a shortened life. An N/P ratio higher than 2.0 will result in the negative electrode not fully charging and low working potential.

In making a cell, as mentioned previously, the hydrogen storage electrode of this invention, before or after cell assembly or sealing, is precharged to a state having a half-cell open circuit potential of −0.790 to −0.905V, preferably −0.820 to −0.885V vs. Hg/HgO reference electrode, and it also has an initial (0–20 minutes) charging potential of −0.830 to −1.005 V, preferably −0.840 to −0.945 V vs. Hg/HgO reference electrode at a current density of 100 mA/g of active material in an alkaline solution. The cell made thus is ready for use with or without a minimum formation process. If the open circuit potential is more negative than −0.905V, the electrode's precharging level is too high. If the open circuit potential is less negative than −0.790V, the electrode has not been treated properly and/or does not have enough precharging level, porosity and microcracks. If the initial charging potential of the hydrogen storage electrode is more negative than −1.005V at a current density of 100 mA/g of active material, the hydrogen storage material in the electrode does not have a clean top surface layer and a metal-rich, especially a nickel-rich, subsurface layer. The hydrogen evolution will occur prematurely during charge. The sealed cell made thus has a poor charging efficiency, low rate capability, poor oxygen recombination, high internal pressure and short life. According to this invention, a hydrogen storage electrode has a state of precharge having a half-cell (steady state) open circuit potential of −0.790 to −0.905V, preferably −0.820 to −0.885V vs. Hg/HgO reference electrode, and also has an initial charging potential of −0.830 to −1.005V, preferably −0.840 to −0.945V vs. Hg/HgO reference electrode at a current density of 100 mA/g of active material. The electrode and the cell made will have a high charging efficiency, fast oxygen recombination and long life. Alternative treatment to the methods mentioned above, a hydrogen storage electrode may be activated and precharged inside a cell before or after cell sealing by mild heating and/or several charge/discharge cycles at 0.02–0.2 c-rate current, at 45°–90° C. for 3–24 hours in an alkaline solution.

According to this invention, a sealed cell made thus has a high charging efficiency, fast oxygen recombination, high rate capability, low internal pressure and long life. Furthermore, during charge at 1 c-rate current, a sealed cell of the present invention has the voltage vs. time (V vs. t) charge curve showing a peak and having −dV equal to −5 to −15 mV/min. at 95–120% charge and a temperature vs. time (T vs. t) curve showing a dT/dt equal to 0.5° to 2° C./min. at 100–120% charge. Therefore it is possible to control the cell during overcharge at high rate current. Consequently, the cell has a long cycle life. The 95–120% charge means that the input of charge is 95–120% of the labeled capacity of the cell. A 1 c-rate current is equal to the labeled capacity (in mAH or AH) of a cell divided by 1 hour. For example, for a 1300 mAH cell, 1 c-rate current is 1300 mA or 1.3 A. Therefore, it is possible to control the charging time of the cell during high rate charge to increase the life.

Figure 2:
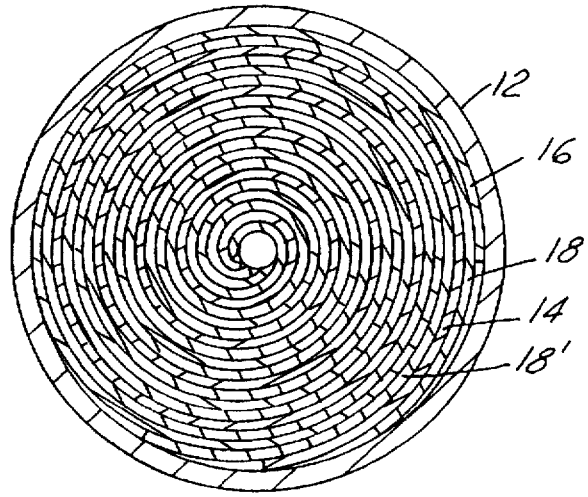
FIG. 2 is a sectional view of the battery according to the present invention, seen along line 2—2 in FIG. 1.

The exemplary alloy of the present invention and its hydride electrode thereof mentioned above were made, tested, and used to make rechargeable hydride cells. The battery is composed of a container, a positive electrode, a negative electrode comprising a body of rechargeable hydrogen storage active material and/or the hydride thereof, a separator positioned between the positive and negative electrodes, and electrolyte in the container and in contact with the positive and negative electrodes and the separator. An example of a hydride battery according to the present invention is depicted in FIGS. 1 and 2. In this drawing, a sealed metal oxide-hydride battery 10 is composed of a container in the form of an exterior casing 12, a positive electrode 14, a negative (hydride) electrode 16 and a separator 18 disposed between the positive and negative electrodes. In this regard, the negative electrode 16, positive electrode 14 and the separator 18 are mutually spirally wound, as shown in FIG. 2. A cover 20 is sealably connected with the casing 12, and is provided with a reseatable safety vent 22.

An electrically insulating member 24 separates the cover 20 from the casing 12. A first tab 26 is connected with the positive electrode 14. The first tab 26 is mounted to the casing 12 by an electrically insulating member 24' and is also connected with the cover 20, resulting in the cover being the positive terminal 28 of the battery 10. A second tab is connected with the bottom 32 of the casing, making the bottom the negative terminal 34 of the battery 10. Before the cover 20 is sealed with respect to the casing 12, a suitable amount of electrolyte is placed within the casing. For example, the casing 12 and cover 20 is a suitable conductive metal, the positive electrode 14 is sheet nickel hydroxide, the negative electrode 16 is a sheet of a hydrogen storage material and/or its hydride thereof according to the present invention, the separator 18 is sheet nylon, and the electrolyte is a KOH+LiOH aqueous solution.

In operation, as shown in Equations 1 and 2, during charging hydroxide ions pass through the separator via the electrolyte from the negative electrode to the positive electrode, and water molecules pass through the separator via the electrolyte from the positive electrode to the negative electrode. During discharge, wherein a load is placed across the positive and negative terminals, water molecules pass through the separator, via the electrolyte, from the negative electrode to the positive electrode, and hydroxide ions pass through the separator, via the electrolyte, from the positive electrode to the negative electrode.

EXAMPLE 1

In accordance with the present invention, an active material of negative electrode, $Ti_{0.218}Zr_{0.180}Ni_{0.400}V_{0.080}Cr_{0.040}Mn_{0.080}Al_{0.002}$ and a sintered hydrogen storage/hydride electrode thereof were made. A suitable size of this negative electrode was cut. According to the present invention, a matching pasted nickel positive electrode and nylon separator were provided to make a rechargeable AA-size sealed nickel-hydride cell. The N/P ratio was 1.38. The electrolyte was 1.60 cc of 30 wt % KOH+5% LiOH aqueous solution. The capacity was up to 1.57 AH at 0.40 A current and 1.42 AH at 2.0 A current. The oxygen recombination rate was excellent. The internal pressure during over charge was about 5 atm. at 1.0 c-rate. It was cycled to 485 times without significant degradation.

EXAMPLE 2

In accordance with the present invention, an active material of negative electrode, $Ti_{0.099}Zr_{0.203}Ni_{0.346}V_{0.277}Mn_{0.020}Cr_{0.049}Al_{0.005}Si_{0.001}$ and a sintered hydrogen storage/hydride electrode thereof were made. A suitable size of this negative electrode was cut. According to the present invention, a matching pasted nickel positive electrode and nylon separator were provided to make a rechargeable C-size sealed nickel-hydride cell. The N/P ratio was 1.45. The electrolyte was 6 cc of 30 wt % KOH+5% LiOH aqueous solution. The oxygen recombination rate of the cell was excellent. The internal pressure during over charge was about 2 atm. at 0.3 c-rate. The capacity was up to 4.02 AH at 7.0 A current. It was cycled to 408 times without significant degradation.

EXAMPLE 3

In accordance with the present invention, an active material of negative electrode, $Ti_{0.10}Zr_{0.31}Nb_{0.01}Ni_{0.46}Mn_{0.08}Cr_{0.04}$ and a pasted hydrogen storage/hydride electrode thereof were made. A suitable size of this negative electrode was cut. According to the present invention, a matching sintered nickel positive electrode and nylon separator were provided to make a rechargeable AA-size sealed nickel-hydride cell. The N/P ratio was 1.50. The electrolyte was 1.80 cc of 30 wt. % KOH+5% LiOH aqueous solution. The capacity was up to 1.33 AH at 1.0 c-rate. The oxygen recombination rate was excellent. The internal pressure during overcharge was about 4.5 atm. at 1.0 c-rate. It was cycled 458 times and no significant degradation was observed.

EXAMPLE 4

In accordance with the present invention, an active material of negative electrode, $Ti_{0.225}Zr_{0.170}V_{0.080}Ni_{0.400}Cr_{0.030}Mn_{0.080}Mo_{0.005}Li_{0.010}$ and a sintered hydrogen storage/hydride electrode thereof were made. A suitable size of this negative electrode was cut. According to the present invention, a matching pasted nickel positive electrode and nylon separator were provided to make a rechargeable AA-size sealed nickel-hydride cell. The N/P ratio was 1.30. The electrolyte was 1.75 cc of 32 wt. % KOH+10% LiOH aqueous solution. The capacity was up to 1320 mAH at 1.0 c-rate. The oxygen recombination rate was excellent. The internal pressure during over charge was about 3 atm at 0.5 c-rate. It was cycled 557 times without significant degradation.

EXAMPLE 5

In accordance with the present invention, an active material of negative electrode, $Ti_{0.098}Zr_{0.201}V_{0.275}Ni_{0.3441}Mn_{0.020}Al_{0.008}Cr_{0.050}Hf_{0.004}$ and a pasted hydrogen storage/hydride electrode thereof were made. A suitable size of this negative electrode was cut. According to the present invention, a matching pasted nickel positive electrode and nylon separator were provided to make a rechargeable AA-size sealed nickel-hydride cell. The N/P ratio was 1.45. The electrolyte was 1.8 cc of 30 wt. % KOH+5% LiOH aqueous solution. The capacity was up to 1481 mAH at a 0.3 c-rate current. The oxygen recombination rate was excellent. The internal pressure during over charge was about 3 atm at 0.5 c-rate. After 450 cycles, less than a 10% capacity drop was observed.

EXAMPLE 6

In accordance with the present invention, an active material of negative electrode, $Ti_{0.090}Zr_{0.270}V_{0.059}Ni_{0.390}Mn_{0.149}Cr_{0.039}Hf_{0.002}$ and a sintered hydrogen storage electrode thereof were made. A suitable size of this negative electrode was cut. According to the present invention, a matching pasted nickel positive electrode and nylon separator were provided to make a rechargeable AA-size sealed nickel-hydride cell. The N/P ratio was 1.40. The electrolyte was 1.8 cc of 30 wt. % KOH+5% LiOH aqueous solution. The capacity was 1.52 AH at 0.45 A current. The oxygen recombination rate was excellent. The internal pressure during over charge was about 5 atm. at 1.0 c-rate. It was cycled 345 times without significant degradation.

To those skilled in the art to which this invention appertains, the above described preferred embodiments may be subjected to change or modification. Such change or modification can be carried out without departing from the scope of the invention, which is intended to be limited only by the scope of the appended claims.

What is claimed is:

1. A method for making a rechargeable hydride battery, said method comprises the steps of: (1) preparing a hydrogen storage electrode having an electrochemical capacity from 1.15 to 2.40 AH/cc as a negative electrode, (2) preparing a positive metal oxide electrode having an electrochemical capacity from 0.45 to 0.75 AH/cc, (3) providing a separator, (4) providing an electrolyte, (5) providing a container, and (6) assembling a rechargeable hydride battery, comprising the steps of: placing said separator between said negative and positive electrodes, placing said separator and said positive and negative electrodes in said container, and placing said electrolyte in said container in contact with said negative and positive electrodes and with said separator; wherein said hydrogen storage electrode comprises at least one hydrogen storage material and/or its hydride, said hydrogen storage material comprises 18–80 at. % of nickel and at least five other different elements as modifiers; wherein said modifiers comprise: (a) at least two hydride formers selected from the group Ti, Zr, Hf, V, Nb, Ta, Y, Sc, and Mg; (b) at least one destabilizing hydride element selected from the group of Mn, Fe, Co, Cu, Zn, Mo, Sn, C, B, Sb, Si, Bi Ge, Ga, N, and Sn; (c) at least one corrosion resistant element selected from the group consisting of Cr, Co, W, Mo, Nb, Hf, and Ta; and (d) at least one element selected from the group of oxygen getters or catalysts, said oxygen getter is selected from the group consisting of alkali metals, Ca, Al, Sr, Ba, Zr, Hf, Ti, rare earth metals, P, and S; said catalyst is selected from the group consisting of Cu, Mn, W, Mo, Pd, Ag, Co and O;

wherein the amount of said hydride former group is 25–68 at. %, the amount of said de-stabilizing agent group is less than 18 at. %, the amount of said corrosion resistant group excluding Nb being less than 15 at. %, the amount of said oxygen getter excluding Zr and Ti is less than 12 at. %, and said catalyst is less than 15 at. %;

wherein said step of electrode preparation further comprises the cleaning and precharging of said hydrogen storage electrode by an electrochemical method in an acidic or alkaline solution or a salt solution at 45°–120° C. for 0.10 to 25 hours at 0.005–0.30 c-rate current, or by a chemical method with an acidic solution at 30°–120° C. for 0.10 to 25 hours or with a saturated or greater than 7.35M of an alkaline solution at 55°–110° C. for 0.10–25 hours;

wherein said acidic solution is selected from a group consisting of $H_2SO_4$, $H_3PO_4$, sulfate, phosphate, HF, $KHF_2$ and the combinations thereof; and said alkaline solution is selected from a group consisting of $NH_4OH$, $N_2H_4$, LiOH, NaOH, $Na_2HPO_4$, KOH (>35 wt. %), and the combinations thereof;

wherein said step of cleaning and precharging includes the control of state of charge and the initial charging potential as the ending point of said cleaning and precharging; said ending point, before or after cell assembly or sealing, is that said hydrogen storage electrode has: (1) a state of charge corresponding to a half-cell open circuit potential of −0.790 to −0.905 V vs. Hg/HgO reference electrode, and (2) an initial charging potential of −0.830 to −1.005V vs. Hg/HgO reference electrode at a current density of 100 mA/g of active material.

2. A method of claim 1, wherein said initial charging potential is of −0.840 to −0.945V.

3. A method of claim 1, wherein said hydrogen storage electrode is cleaned and precharged by a chemical method at temperature 52°–100° C. for 0.20 to 15 hours with an acidic solution selected from a group consisting of $H_2SO_4$, $H_3PO_4$, sulfate, phosphate, HF, $KHF_2$ and the combinations thereof.

4. A method of claim 1, wherein said electrochemical method is performed in an acidic or alkaline solution or a salt solution at 45°–120° C. for 0.10 to 25 hours at 0.005–0.30 c-rate current.

5. A method of claim 1, wherein said chemical method is performed at 72°–100° C. for 0.15–20 hours with a saturated or greater than 7.35M of an alkaline solution selected from: $NH_4OH$, $N_2H_4$, LiOH, NaOH, $Na_2HPO_4$, KOH (>35 wt. %), and the combinations thereof.

6. A method of claim 1, wherein said alkaline solution is selected from a group consisting of NaOH, KOH, $Na_2HPO_4$, and the combination thereof at 72°–100° C.

7. A method of claim 1, wherein said solution further comprises a metal selected from a group consisting of Al, Zn, Raney nickel, Mg, Al-Mg alloy, and the combination thereof.

8. A method of claim 1, wherein said hydrogen storage material has a thin oxide-rich top surface layer and a metal-rich subsurface layer, where said oxide-rich top surface layer has a thickness less than 750 angstroms and has more than 50 at. % of metal in the oxide form, and where said metal-rich layer has a thickness of 100–2000 angstroms and has more than 50 at. % of metal in metallic form.

9. A method of claim 8, wherein the thickness of said oxide-rich top layer is less than 350 angstroms.

10. A method of claim 8, wherein said metal-rich subsurface layer consists of at least 40 at. % of Ni.

11. A method of claim 1, wherein the microstructure of said hydrogen storage material comprises grain boundaries and/or at least one type of grains, having compositions comprises nickel.

12. A method of claim 1, wherein the microstructure of said hydrogen storage material comprises at least one type of grains having compositions comprises hydride formers.

13. A method of claim 1, wherein said hydrogen storage material comprises at least two types of grains in the microstructure.

14. A method of claim 1, wherein the preparation of said hydrogen storage electrode includes the use of one or more powder binders selected from the group consisting of Ni, Cu, Al, Mg, Al-Mg alloy, Zn, Mn, and C.

15. A method of claim 1, wherein said step of cell making further includes a mild heating at 45°–90° C. for 3–24 hours before or after cell sealing.

16. A method of claim 1, wherein said hydrogen storage electrode has a state of charge corresponding to a half-cell open circuit potential of −0.820 to −0.885 V vs. Hg/HgO reference electrode.

17. A battery made in accordance with the method of claim 1.

18. A battery made in accordance with the method of claim 1, said battery is a sealed cell.

19. A battery made in accordance with the method of claim 1, said battery during charging at 1 c-rate current has a voltage vs. time charge curve showing a peak and has a −dV equal to −5 to −15 mV/min at 95–120% charge.

20. A battery made in accordance with the method of claim 1, said battery is a sealed cell and, during charge at 1 c-rate current, has a temperature vs. time curve showing a dT/dt equal to 0.5° to 2° C./min. at 100–120% charge.

21. A method of claim 1, wherein said hydrogen storage material comprises 30–65 at. % of nickel.

22. A method of claim 1, wherein said positive electrode comprises a nickel oxide plus 1–15 wt. % cobalt oxide and 0–15 wt. % of powder selected from the group consisting of Ni, Cu, C, Zn, Mg, Al, Mn, iodine, iodide, hydride, and combinations thereof.

23. A method for making a rechargeable nickel hydride battery, said method comprises the steps of: (1) preparing a hydrogen storage electrode as a negative electrode having an electrochemical capacity from 1.15 to 2.40 AH/cc, (2) preparing a positive metal oxide electrode having an electrochemical capacity from 0.45 to 0.75 AH/cc, (3) providing a separator, (4) providing an electrolyte, (5) providing a container, and (6) assembling a rechargeable hydride battery, comprising the steps of: placing said separator between said negative and positive electrodes, placing said separator and said positive and negative electrodes in said container, and placing said electrolyte in said container in contact with said negative and positive electrodes and with said separator;

wherein said hydrogen storage electrode comprises at least one hydrogen storage material and/or its hydride; said hydrogen storage material has a composition formula:

$A_a B_b Ni_c D_y M_x R_z$ and its hydride thereof, where A consists of Ti plus at least one element selected from the group consisting of Zr, Hf, Nb, and Mg; B is at least one element selected from the group consisting of Al, V, Mn, Si, Pd, and Ag; D is at least one element selected from the group consisting of Cr, Fe, Co, Cu, Zn, Nb, Mo, W, and Sn; R is at least one element selected from the group consisting of C, B, Ca, Sb, Bi, Sc, Y, Hf, Ta, O, N, Ge, Ga, and Mm, where Mm is mischmetal; M is at least one element selected from the group consisting of Li, Na, K, Rb, Cs, P, and S; and where the atomic mole ratios, a, b, c, x, y and z are defined by: $0.10 \leq a \leq 0.85$, $0 < b \leq 0.28$, $0.18 \leq c \leq 0.80$, $0 \leq x \leq 0.30$, $0 \leq y \leq 0.30$, $0 \leq z < 0.30$, and $a+b+c+x+y+z=1.00$;

wherein said step of preparation further comprises the cleaning and precharging of said hydrogen storage electrode by an electrochemical method in an acidic or alkaline solution or a salt solution at 45°–120° C. for 0.10 to 25 hours at 0.005–0.30 c-rate current, or by a chemical method with an acidic solution at 30°–120° C. for 0.10 to 25 hours or with a saturated or greater than 7.35M of an alkaline solution at 55°–110° C. for 0.10–25 hours;

wherein said acidic solution is selected from a group consisting of $H_2SO_4$, $H_3PO_4$, sulfate, phosphate, HF, $KHF_2$, and the combinations thereof; and said alkaline solution is selected from a group consisting of $NH_4OH$, $N_2H_4$, LiOH, NaOH, $Na_2HPO_4$, KOH (>35 wt. %), and the combinations thereof;

wherein said step of cleaning and precharging includes the control of state of charge and the initial charging potential as the ending point of said cleaning and precharging; said ending point, before or after cell assembly or sealing, is that said hydrogen storage electrode has: (1) a state of charge corresponding to a half-cell open circuit potential of −0.790 to −0.905V vs. Hg/HgO reference electrode, and (2) an initial charging potential of −0.830 to −1.005V vs. Hg/HgO reference electrode at a current density of 100 mA/g of active material.

24. A method of claim 23, wherein hydrogen storage material has a thin oxide-rich top surface layer and a metal-rich subsurface layer; where said oxide-rich top surface layer has a thickness less than 750 angstroms and has more than 50 at. % of metal in the oxide form; and where said metal-rich layer has a thickness of 100–2000 angstroms and has more than 50 at. % of metal in metallic form.

25. A method of claim 24, wherein said metal-rich layer consists of at least 40 at. % of Ni.

26. A method of claim 23, wherein the microstructure of said hydrogen storage material comprises grain boundaries and/or at least one type of grains, having compositions comprises nickel.

27. A method of claim 23, wherein the microstructure of said hydrogen storage material comprises at least one type of grains having compositions comprises hydride formers.

28. A method of claim 23, wherein said hydrogen storage material comprises at least two types of grains in the microstructure.

29. A battery made in accordance with the method of claim 23.

30. A battery made in accordance with the method of claim 23, said battery is a sealed battery.

31. A method to make a sealed hydride battery, said method comprises the preparation of a hydrogen storage electrode as a negative electrode;

wherein said step of preparation further comprises the cleaning and precharging of said hydrogen storage electrode by an electrochemical method in an acidic or alkaline solution or a salt solution at 45°–120° C. for 0.10 to 25 hours at 0.005–0.30 c-rate current, or by a chemical method with an acidic solution at 30°–120° C. for 0.10 to 25 hours or with a saturated or greater than 7.35M of an alkaline solution at 55°–110° C. for 0.10–25 hours;

wherein said step of cleaning and precharging includes the control of state of charge and the initial charging potential as the ending point of said cleaning and precharging, said ending point is that, before or after cell assembly or sealing, said hydrogen storage electrode has: (1) a state having a half-cell open circuit potential of −0.790 to −0.905 V vs. Hg/HgO reference electrode, and (2) an initial charging potential of −0.840 to −0.945 V vs. Hg/HgO electrode at a current density of 100 mA/g of active material;

wherein said acidic solution is selected from a group consisting of $H_2SO_4$, $H_3PO_4$, sulfate, phosphate, HF, $KHF_2$ and the combinations thereof; and said alkaline solution is selected from a group consisting of $NH_4OH$, $N_2H_4$, LiOH, NaOH, $Na_2HPO_4$, KOH (>35 wt. %), and the combinations thereof;

wherein said hydrogen storage material has a thin oxide-rich top surface layer and a metal-rich subsurface layer; where said oxide-rich top surface layer has a thickness less than 750 angstroms and has more than 50 at. % of metal in the oxide form; and where said metal-rich layer has a thickness of 100–2000 A and has more than 50 at. % of metal in metallic form; wherein said metal-rich subsurface layer consists of is at least 40 at. % of Ni;

wherein said hydrogen storage electrode comprises a hydrogen storage material selected from the groups having a composition represented by the formula:

$Ti_aZr_bNi_cMn_dD_eCr_fM_x$ and its hydride;

where D is V and/or Nb; M is at lease one element selected from the group of Al, Fe, Co, Cu, Zn, Mo, Sn, C, B, Sb, Si, Bi, Ge, Ga, N, W, Ca, Sr, Ba, Hf, Pd, Ag, O, alkali metals, and Mm; where Mm is mixture of rare earth metals; and the atomic mole ratios a, b, c, d, e, f, and x are defined by: $0.01 \leq a \leq 0.65$, $0.01 \leq b \leq 0.45$, $0.18 \leq c \leq 0.80$, $0<d\leq0.25$, $0<e<0.30$, $0\leq p<0.30$, $0\leq x<0.15$, and $a+b+c+d+e+p+x=1.00$.

32. A battery made in accordance with a method of claim 31.

33. A battery made in accordance with a method of claim 31, said battery is a nickel hydride battery.

34. A method to make a sealed hydride battery, said method comprises the preparation of a hydrogen storage electrode as a negative electrode;

wherein said step of preparation further comprises the cleaning and precharging of said hydrogen storage electrode by an electrochemical method in an acidic or alkaline solution or a salt solution at 45°–120° C. for 0.10 to 25 hours at 0.005–0.30 c-rate current, or by a chemical method with an acidic solution at 30°–120° C. for 0.10 to 25 hours or with a saturated or greater than 7.35M of an alkaline solution at 55°–110° C. for 0.10–25 hours;

wherein said step of cleaning and precharging includes the control of state of charge and the initial charging potential as the ending point of said cleaning and precharging; said ending point, before or after cell assembly or sealing, is that said hydrogen storage electrode has: (1) a state having a half-cell open circuit potential of −0.790 to −0.905 V vs. Hg/HgO reference electrode, and (2) an initial charging potential of −0.840 to −0.945 V vs. Hg/HgO electrode at a current density of 100 mA/g of active material;

wherein said acidic solution is selected from a group consisting of $H_2SO_4$, $H_3PO_4$, sulfate, phosphate, HF, $KHF_2$ and the combinations thereof; and said alkaline solution is selected from a group consisting of $NH_4OH$, $N_2H_4$, LiOH, NaOH, $Na_2HPO_4$, KOH (>35 wt. %), and the combinations thereof;

wherein said hydrogen storage material has a thin oxide-rich top surface layer and a metal-rich subsurface layer, where said oxide-rich top surface layer has a thickness less than 750 angstroms and has more than 50 at. % of metal in the oxide form; and where said metal-rich layer has a thickness of 100–2000 A and has more than 50 at. % of metal in metallic form, wherein said metal-rich subsurface layer consists of is at least 40 at. % of Ni;

wherein said hydrogen storage electrode comprises at least one hydrogen storage material having a composition formula:

$A_aB_bNi_cD_yQ_pM_xR_z$ and its hydride thereof;

where A consists of Ti plus at least one element selected from the group consisting of Zr, Hf, Nb, and Mg; B is at least one element selected from the group consisting of V, Mn, and Cr; D is Al and/or Si; Q is at least one element selected from the group consisting of: Fe, Co, Cu, Zn, Nb, Mo, W, Pd, Ag and Sn; R is at least one element selected from the group consisting of: C, B, Ca, Sb, Bi, Sc, Y, Hf, Ta, O, N, Ge, Ga and Mm, where Mm is the mischmetal; M is at least one element selected from the group consisting of Li, Na, K, Rb, Cs, P and S; where the atomic mole ratio, a, b, c, p, x, y and z are defined by:

$0.10 \leq a \leq 0.85$, $0<b\leq0.38$, $0.18\leq c\leq0.80$, $0<y\leq0.15$, $0<p\leq0.30$, $0\leq x\leq0.30$, $0\leq z\leq0.30$, and $a+b+c+x+y+z+p=1.00$.

35. A method of claim 34, wherein the microstructure of said hydrogen storage material comprises grain boundaries and/or at least one type of grains, having compositions comprises nickel.

36. A method of claim 34, wherein the microstructure of said hydrogen storage material comprises at least one type of grains having compositions comprises hydride formers.

37. A method of claim 34, wherein said hydrogen storage material comprises at least two types of grains in the microstructure.

38. A battery made in accordance with the method of claim 34.

39. A method of claim 34, wherein said oxide-rich top surface layer has a thickness less than 100–150 angstroms.

40. A method to make a sealed nickel hydride battery, said method comprises the preparation of a hydrogen storage electrode as a negative electrode and a nickel electrode as a positive electrode;

wherein said step of preparation further comprises the cleaning and precharging of said hydrogen storage electrode by an electrochemical method in an acidic or alkaline solution or a salt solution at 45°–120° C. for 0.10 to 25 hours at 0.005–0.30 c-rate current, or by a chemical method with an acidic solution at 30°–120° C. for 0.10 to 25 hours or with a sainted or greater than 7.35M of an alkaline solution at 55°–110° C. for 0.10–25 hours;

wherein said step of cleaning and precharging includes the control of state of charge and the initial charging potential as the ending point of said cleaning and precharging; said ending point, before or after cell assembly or sealing, is that said hydrogen storage electrode has: (1) a state having a half-cell open circuit potential of −0.790 to −0.905 V vs. Hg/HgO reference electrode, and (2) an initial charging potential of −0.840 to −0.945 V vs. Hg/HgO electrode at a current density of 100 mA/g of active material;

wherein said acidic solution is selected from a group consisting of $H_2SO_4$, $H_3PO_4$, sulfate, phosphate, HF, $KHF_2$ and the combinations thereof; and said alkaline solution is selected from a group consisting of $NH_4OH$, $N_2H_4$, LiOH, NaOH, $Na_2HPO_4$, KOH (>35 wt. %), and the combinations thereof;

wherein said hydrogen storage material has a thin oxide-rich top surface layer and a metal-rich subsurface layer, where said oxide-rich top surface layer has a thickness less than 750 angstroms and has more than 50 at. % of metal in the oxide form, and where said metal-rich layer has a thickness of 100–2000 A and has more than 50 at. % of metal in metallic form, wherein said metal-rich subsurface layer consists of is at least 40 at. % of Ni;

wherein said hydrogen storage electrode comprises at least one hydrogen storage material consisting of at least six elements selected from the group having a composition formula:

$Ti_aZr_bNi_cMn_dD_eQ_pR_xM_z$, and its hydride thereof, $Ti_aZr_bNi_cMn_dD_eCr_pM_xR_z$ and its hydride, $Ti_aZr_bNi_cMn_dV_eMo_pM_xR_z$ and its hydride thereof, $Ti_aZr_bNi_cMn_dNb_eCr_pM_xR_z$ and its hydride thereof, $Ti_aHf_bNi_cMn_dV_eMo_pM_xR_z$ and its hydride thereof, $Ti_aZr_bNi_cMn_dV_eCr_pM_xR_z$ and its hydride thereof;

where D is V and/or Nb; Q is at least one element selected from the group consisting of Cr and Mo; M is at least one element selected from the group consisting of Hf, C, B, Zn, Sn, Sb, Nb, Bi, Sc, Y, Ta, N, O, Ge, Ga Li, Na, K, Rb, Cs, P and S; R is at least one element selected from the group consisting of Al, Mg, Ca, Si, Cr, Co, Fe, Cu, W, Mo, Pd, Ag, and Mm, where Mm is mischmetal; and where the atomic mole ratios: a, b, c, p, x, y and z are defined by: $0.01 \leq a \leq 0.65$, $0 < b \leq 0.45$, $0.18 \leq c \leq 0.80$, $0 \leq d \leq 0.22$, $0 \leq e \leq 0.38$, $0 \leq p \leq 0.30$, $0 \leq x \leq 0.15$, $0 \leq z \leq 0.15$, and $a+b+c+d+e+p+x+z=1.00$;

wherein said positive electrode has electrochemical capacity from 0.45 to 0.75 AH/cc and comprises a nickel oxide plus 1–15 wt. % cobalt oxide and 0–15 wt. % of powder selected from the group consisting of Ni, Cu, C, Zn, Mg, Al, Mn, iodine, iodide, hydride, and combinations thereof.

41. A battery made in accordance with the method of claim 40.

42. A method of claim 40, wherein said hydrogen storage electrode has a state of charge having a half-cell open circuit potential of 31 0.820 to −0.885 V vs. Hg/HgO reference electrode.

43. A sealed nickel hydride battery, said battery comprises: a container, a hydrogen storage electrode as a negative electrode, a positive electrode, a separator positioned between said positive and negative electrodes in said container, an electrolyte in said container in contact with said negative and positive electrodes and with said separator;

wherein said hydrogen storage electrode has an electrochemical capacity from 1.15 to 2.40 AH/cc and comprises at least one hydrogen storage material, said hydrogen storage material comprises 18–80 at. % of nickel and at least five other different elements as modifiers; wherein said modifiers comprise: (a) at least two hydride formers selected from the group Ti, Zr, Hf, V, Nb, Ta, Y, Sc, and Mg, the amount of said hydride former group being 25–68 at. %, (b) at least one destabilizing hydride element selected from the group of Mn, Fe, Co, Cu, Zn, Mo, Sn, C, B, Sb, Si, Bi Ge, Ga, N, and Sn, the amount of said de-stabilizing agent group being less than 18 at. %, (c) at least one corrosion resistant element selected from the group consisting of Cr, Co, W, Mo, Nb, Hf, and Ta, the amount of said corrosion resistant group excluding Nb being less than 15 at. %, and (d) at least one element selected from the group of oxygen getters or catalysts, wherein said oxygen getter is selected from the group consisting of alkali metals, Ca, Al, Sr, Ba, Zr, Hf, Ti, rare earth metals, P, and S, said catalyst is selected from the group consisting of Cu, Mn, W, Mo, Pd, Ag, Co and O, wherein the amount of said oxygen getter group excluding Zr and Ti is less than 12 at. % and said catalyst is less than 15 at. %;

wherein said hydrogen storage material and/or its hydride having a thin oxide-rich top surface layer and a metal-rich subsurface layer, where said oxide-rich top surface layer has more than 50 at. % of metal in the oxide form and has a thickness less than 750 angstroms, and where said metal-rich layer has more than 50 at. % of metal in metallic form and consists of at least 40 at. % of nickel;

wherein said hydrogen storage material has a microstructure that comprises grain boundaries and/or at least one type of grains having nickel-rich composition, and at least one type of grains having hydride former-rich composition;

wherein the amount of nickel in said nickel-rich composition is greater than any other elements, wherein at least one of the hydride formers in said hydride former-rich composition has a greater amount of atomic percent than nickel;

wherein said positive electrode has an electrochemical capacity from 0.45 to 0.75 AH/cc, and said positive electrode comprises a nickel oxide plus 1–15 wt. % cobalt oxide and 0–15 wt. % of powder selected from the group consisting of Ni, Cu, C, Zn, Mg, Al, Mn, iodine, iodide, hydride, and combinations thereof; wherein the N/P ratio, the electrochemical capacity ratio of said negative electrode to said positive electrode, is between 1.0 and 2.0;

wherein said battery during charge at 1 c-rate current has a voltage vs. time charge curve showing a peak and having −dV equal to −5 to −15 mV/min. at 95–120% charge;

wherein said battery during charge at 1 c-rate current has a temperature vs. time curve showing a dT/dt equal to 0.5° to 2° C./min. at 100–120% charge.

44. A battery of claim 43, wherein said hydrogen storage material and/or its hydride has a microstructure comprising at least one type of grains having nickel-rich composition consisting of at least 40–65 at. % of nickel.

* * * * *